2,847,285
Patented Aug. 12, 1958

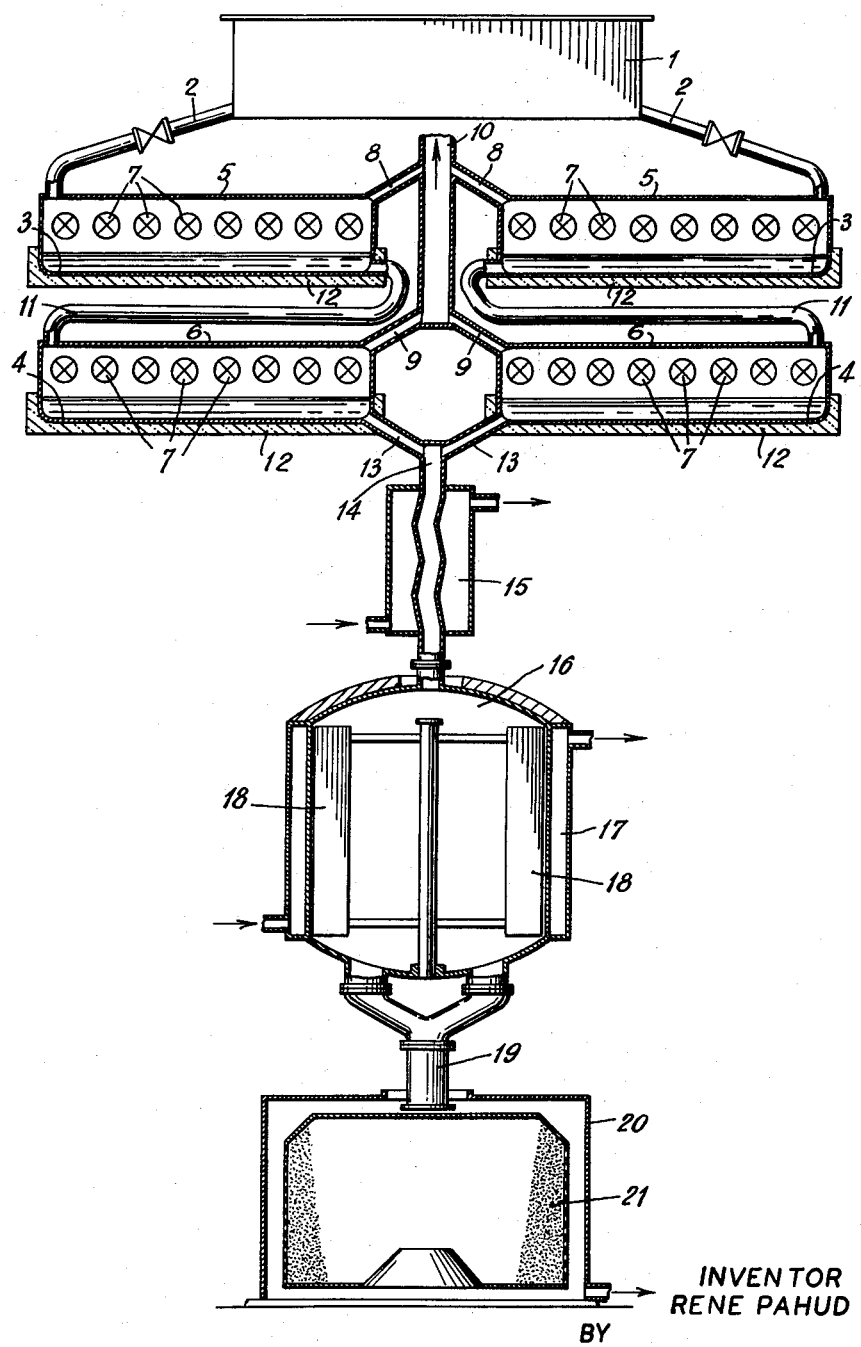

2,847,285

PROCESS FOR MANUFACTURING CRYSTALLIZED PURE AND ANHYDROUS PHOSPHORIC ACID, AND INSTALLATION FOR CARRYING OUT SAID PROCESS

René Pahud, Bex, Switzerland, assignor to La Fonte Electrique S. A., Bex, Switzerland, a corporation of Switzerland Application April 5, 1954, Serial No. 421,126

Claims priority, application Switzerland February 9, 1954

2 Claims. (Cl. 23—300)

Until now, crystallized phosphoric acid assaying at least 98% of $H_3PO_4$ was only a laboratory product, expensive to prepare and difficult to obtain in industrial quantities. Now, many industries are very interested in being able to dispose, in large quantities, of crystallized pure and anhydrous phosphoric acid (that is to say assaying at least 98% of $H_3PO_4$) at a paying price for their fabrications. Among such industries, one may mention, inter alia, those dealing with the polishing of aluminum and non-ferrous metals, with the synthesis of organic compounds, with the manufacture of phosphates intended for feeding purposes, with the preparation of medicines (phosphoric esters), etc.

The present industrial manufacturing processes of phosphoric acid give products where the phosphoric acid is in solution in water. The current concentration in $H_3PO_4$ of these products varies from 75 to 84%. In order to obtain higher concentrations, the generally used concentration method, which consists in dissolving some $P_2O_5$ in these acid solutions, gives mixtures of orthophosphoric, pyrophosphoric and metaphosphoric acids, of which the exact composition is not constant and which it is no longer possible to call phosphoric acid; they are very heavy molasses, difficult to handle, which are called "superphosphoric acid," "tetraphosphoric acid," etc.

Crystallized phosphoric acid cannot be extracted from these acids without involving high additional expenses.

If it has not been possible, so far, to supply industry with practically anhydrous phosphoric acid, this is due to the lack of an economical process making it possible to industrially produce crystallized phosphoric acid, assaying at least 98%.

The present invention remedies such absence. It comprises a process for manufacturing crystallized pure and anhydrous phosphoric acid, from aqueous solutions of this acid, and also an installation for carrying out said process.

This process consists in putting the starting solution under the form of a liquid sheet, heating the latter on its surface in order to cause a superficial evaporation of its water until the obtention of a mass assaying at least 68% of $P_2O_5$, causing this mass to crystallize by cooling down, letting the formed crystals reach at least 1 mm. in their largest dimension and, finally, centrifuging the formed crystals in order to free them of their mother liquor.

It should be noted that the separation by centrifugation of the crystals from their mother liquor entails a purification, so that the starting solutions need not necessarily be pure; they may very well be impure. In addition, the concentration thereof may vary within wide limits. The result is that the process of the invention is easily adapted and may be applied to the products of the various industrial fabrications of phosphoric acid.

The obtained phosphoric acid, which assays at least 98%, is crystallized, hence pure and in solid form, hitherto unknown to industry. In this form, the phosphoric acid practically no longer contains water; it is at its maximum concentration, which opens up new possibilities of use. One may mention, for instance, the polishing baths to which one was obliged to mix oleum with the $H_3PO_4$ solutions in order to dehydrate them.

Moreover, a crystallized product melting only above 40° C. is easily handled; it may be packed into paper bags having an inside plastic material lining; transportation expenses are cut down to a minimum; the use of glass containers, always fragile and bulky, is eliminated.

When solutions of phosphoric acid are concentrated, the evaporation of water must take place at low temperature, if a dehydration into pyro- or meta-phosphoric acid is to be avoided. The result is that such operation cannot be performed by ordinary heating means.

According to the invention process, heating of the starting solution is achieved at the surface of the latter and when it is under the form of a sheet; in this way, a superficial evaporation of the solution is brought about, avoiding the above-mentioned dehydration. In addition, it was found that this superficial heating may very advantageously be obtained by means of infra-red radiations, which makes it possible to obtain a high concentration of the solution, which becomes then a mass capable of assaying up to 71% of $P_2O_5$.

It was further found that the formation of pyro-phosphoric acid and/or polyphosphoric acid, at the time of concentration of the starting solution, is hindered when this solution contains an oxidizing agent. It is therefore advantageous to add an oxidizing agent to the starting solution, which, on the one hand, increases the yield in $H_3PO_4$ and, on the other hand, makes it possible to carry out the evaporation at high temperature. The oxidizing agent, which may advantageously be wholly or partly volatile, further presents the advantage, should the case arise, of destroying all or a part of oxidizable impurities which may be contained in the starting solution. This oxidizing agent may be, for instance, a chlorate, hydrogen peroxide, a permanganate, a perphosphate, a compound obtained by anodic oxidation of the starting solution.

The latter advantage is particularly appreciable when one must deal with the concentration of solutions containing organic substances which carbonize themselves during the concentration, until giving with the acid a black tarry juice. These organic substances must therefore be destroyed without introducing in the acid a troublesome inpurity. The addition of sodium chlorate makes it possible to completely eliminate the organic substances which are oxidized, while the chlorate is reduced and eliminates itself partly under the form of chlorine and hydrochloric acid and partly with the mother liquors. Once crystallization is achieved, one must be able to eliminate the mother liquors from the crystalline magma. As these mother liquors are very syrupy (kinematic viscosity index 600 centistokes) the acid crystals must reach at least 1 mm. and advantageously exceed 2 mm. in length, otherwise centrifugation becomes impossible. This condition may be fulfilled by achieving crystallization in a crystallizer fitted with a stirrer, the peripheric speed of which does not exceed 1 to 2 m./sec. If the speed is higher, the crystals break up and centrifugation cannot be sufficiently intensified.

After having been centrifuged, the crystals, if kept away from dampness, remain unaltered; they may be put into bags; they constitute an industrial product of great usefulness.

The obtained crystallized acid assays at least 98% of $H_3PO_4$, the balance being chiefly water up to a maximum of 1.5%, the possible $Na_2O$ and $K_2O$ impurities representing together 1% at the most.

The yield of the invention process, that is to say the quantity of phosphoric acid retrieved in the final crystallized product, in relation to that contained in the starting solution, varies from 60 to 95%. This yield is mainly influenced by the purity of the starting solution, in that the purer the latter is, the higher is the yield, because the quantity of mother liquor necessary for eliminating the impurities decreases in function of the impurity contents of the starting solution.

The installation, which makes it possible to carry out the process of the present invention, comprises an evaporating apparatus constituted by at least one vat surmounted by a source of infra-red radiations, a crystallization device fitted with cooling means and a hydro-extractor.

It may be advantageous to enclose the said vat and the infra-red radiations source in a vacuum-chamber, because the superficial evaporation of the starting solution may thus be performed at a pressure lower than atmospheric pressure.

The sole figure of the attached drawing represents diagrammatically, by way of example, an embodiment of an installation in accordance with the invention, in front view and with parts in cross-section.

This installation will be described below, while following the various stages of the invention process and describing said process at the same time.

A tank 1 contains the phosphoric acid starting solution. One may add to this solution an oxidizing agent, preferably a volatile one. The solution is then ready for concentration and is allowed to flow, through pipes 2, into evaporating apparatuses, two of these being represented on the drawing and operating in parallel.

These apparatuses are each constituted by two vats 3 and 4, each surmounted by vacuum-chambers 5 and 6, respectively, in which are arranged emitters 7 of infra-red radiations. The two chambers 5 and 6 are connected to an intake fan (which is not represented) by the tubes 8 and 9 and by the pipe 10. The vats 3 and 4 follow each other, the starting solution arriving in the vat 3, then flowing into the vat 4 by the pipe 11. The vats are thermally insulated on their outside by a lining 12. The solution which flows into them is heated by the radiation of the emitters 7 while being under reduced pressure. The water thus evaporated is withdrawn by the pipe 10. The acid is thus concentrated without formation of pyrophosphoric and metaphosphoric acids. This formation is moreover prevented by the presence of the oxidizing agent, which also oxidizes the oxidizable impurities which may be contained in the starting solution.

The solution is treated in the evaporation apparatuses until assaying at least 68% of $P_2O_5$. It then flows through the pipes 13 and 14 into a heat exchanger 15 where it is partly cooled down. Therefrom, it is directed onto a crystallizing device 16. It is in the latter that the crystals are formed by a suitable cooling down of the mass by means of a circulating water jacket 17.

This device is fitted with a stirrer 18 having a specially designed form in order not to break up the crystals and of which the speed does not exceed 2 cm./sec. Thanks to this arrangement, the crystals reach at least 1 mm. in their largest dimension.

The crystal magma thus obtained is removed from the crystallizing device (by air pressure) and is introduced by means of the pipes 19 into a hydro-extractor 20. The mother liquors are thus eliminated from the product 21 which is then put into bags under crystalline form.

The following is a numerical example of an operation in accordance with the invention process, performed in the installation which has just been described:

One starts from 10,000 kg. of technical phosphoric acid at about 75% of $H_3PO_4$, containing, among others, impurities such as $K_2O+Na_2O$, 2 to 3%; Fe+Al, 0.2%; Ca, 0.2 to 0.3%; $SO_4$, 0.3%; Cl, 0.1 to 0.2%; F, 0.2 to 0.3%. One adds to this acid, while it is in the tank 1, ten litres of a 50% solution of $NaClO_3$, one stirs and one lets rest 4 to 5 days. Afterwards, the acid is fed into the evaporation apparatuses which are fitted with a heater having a power of 15 kw. In the first vat 3 the evaporation temperature does not exceed 100°; 80% of the water to be eliminated are eliminated at this temperature. In the last vat 4, the temperature exceeds 100° in order to obtain the elimination of the last 20% of the water to be evaporated. The circulation speed is so adjusted that the concentration of the acid is brought to 98% of $H_3PO_4$, at the exit from the evaporating apparatuses. The acid is then cooled down to 50° C. in the cooler 15. In the crystallizer 16 it is inseminated and crystallized by cooling down to 18°–20°. The crystallization operation lasts about 6 hours. The hydro-extractor 20 is made of chemically resisting material, with a diameter of 120 cm. and revolves at 900 R. P. M.

The centrifugation is completed after 20 to 30 minutes and all there is still to do is to collect the crystals 21. One collects 5,250 kg. of same, which represents a yield of 70% in relation to the $H_3PO_4$ contained in the starting solution. The obtained crystallized acid corresponds to the following analysis:

| | |
|---|---|
| $H_3PO_4$ | 98 to 99%. |
| Fe | Less than 0.03%. |
| Al | Less than 0.01%. |
| CaO | Less than 0.1%. |
| Cl | Less than 0.000%. |
| F | Less than 0.000%. |
| $SO_4$ | Less than 0.05%. |
| $Na_2O+K_2O$ | 0.5–1.0%. |
| As | 0.1 to 1 part per million. |

What I claim is:

1. A process for manufacturing crystallized pure and anhydrous phosphoric acid from an aqueous solution thereof, which comprises incorporating an oxidizing agent into said aqueous solution, spreading the solution into which the oxidizing agent has been incorporated over an extended area in the form of a liquid sheet having an exposed upper surface, applying heat to said liquid sheet at its exposed surface only from above said surface in order to cause a superficial evaporation of water therefrom, without concomitant dehydration of the phosphoric acid into pyro- or meta-phosphoric acid, until the liquid sheet assays at least 68% of $P_2O_5$, in a subsequent stage cooling and crystallizing the resultant liquid mass until the crystals formed in the liquid mass attain at least 1 mm. in their larger dimensions, and finally centrifuging the said crystals in order to free them from their cooled mother liquor.

2. A process according to claim 1 in which the heating is effectuated by means of a source of infra-red radiations.

References Cited in the file of this patent

UNITED STATES PATENTS

| | | |
|---|---|---|
| 1,451,786 | Ross et al. | Apr. 17, 1923 |
| 1,889,929 | Moore | Dec. 6, 1932 |
| 2,035,990 | Siegler | Mar. 31, 1936 |
| 2,091,898 | Weber | Aug. 31, 1937 |
| 2,221,770 | Almond | Nov. 19, 1940 |
| 2,346,517 | Thompson et al. | Apr. 11, 1944 |
| 2,415,797 | Low | Feb. 11, 1947 |
| 2,548,909 | Ryden | Apr. 17, 1951 |